(12) United States Patent
Bailey et al.

(10) Patent No.: US 7,616,797 B2
(45) Date of Patent: Nov. 10, 2009

(54) MINUTIA DETECTION FROM MEASUREMENT OF A HUMAN SKULL AND IDENTIFYING AND PROFILING INDIVIDUALS FROM THE HUMAN SKULL DETECTION

(76) Inventors: Kenneth S. Bailey, 2149 Vista Dorado, Newport Beach, CA (US) 92660; Fernando A. Barrera, 7135 Capistrano Ave., West Hills, CA (US) 91307

( * ) Notice: Subject to any disclaimer, the term of this patent is extended or adjusted under 35 U.S.C. 154(b) by 650 days.

(21) Appl. No.: 11/211,159

(22) Filed: Aug. 23, 2005

(65) Prior Publication Data
US 2006/0104489 A1    May 18, 2006

Related U.S. Application Data

(60) Provisional application No. 60/603,603, filed on Aug. 23, 2004.

(51) Int. Cl.
*G06K 9/00*    (2006.01)
(52) U.S. Cl. ............................. 382/128; 382/115; 342/22
(58) Field of Classification Search ................... 382/128
See application file for complete search history.

(56) References Cited

U.S. PATENT DOCUMENTS

| | | | |
|---|---|---|---|
| 3,490,037 A | | 1/1970 | Williams |
| 3,691,557 A | | 9/1972 | Constant |
| 3,801,978 A | | 4/1974 | Gershberg et al. |
| 4,519,037 A | * | 5/1985 | Brodeur et al. ............... 700/90 |
| 4,552,151 A | | 11/1985 | Bolomey et al. |
| 4,773,029 A | | 9/1988 | Claesson et al. |
| 4,901,084 A | * | 2/1990 | Huguenin et al. ............ 342/179 |
| 4,910,523 A | * | 3/1990 | Huguenin et al. ............ 342/179 |
| 4,940,986 A | * | 7/1990 | Huguenin ..................... 342/410 |
| 4,975,968 A | | 12/1990 | Yukl |
| 4,975,969 A | * | 12/1990 | Tal ............................... 382/116 |
| 5,047,783 A | * | 9/1991 | Hugenin ....................... 342/179 |
| 5,073,782 A | * | 12/1991 | Huguenin et al. ............ 342/179 |
| 5,202,692 A | * | 4/1993 | Huguenin et al. ............ 342/179 |
| 5,227,800 A | * | 7/1993 | Huguenin et al. ............ 342/179 |
| 5,302,962 A | * | 4/1994 | Rebuffi et al. ............. 343/781 P |
| 5,363,050 A | | 11/1994 | Guo et al. |
| 5,438,336 A | | 8/1995 | Lee et al. |
| 5,450,504 A | * | 9/1995 | Calia ............................ 382/118 |
| 5,541,985 A | | 7/1996 | Ishii et al. |
| 5,578,933 A | | 11/1996 | Nonaka |
| 5,588,435 A | * | 12/1996 | Weng et al. .................. 600/443 |
| 5,715,819 A | | 2/1998 | Svenson et al. |

(Continued)

FOREIGN PATENT DOCUMENTS

JP    2002-247162    8/2002

(Continued)

OTHER PUBLICATIONS

Ishii, T. Koryu, *Handbook of Microwave Technology*, vol. 2, Academic Press (1995), pp. 187-193 & 309-345.

*Primary Examiner*—Sath V. Perungavoor

(57) ABSTRACT

Individual information about a person's body part is obtained. The body part is defined to have reference points. A geometrical part is extended between those reference points, and characteristics of the geometrical part as so extended are determined. These characteristics are used as minutae to compare against other body parts.

11 Claims, 7 Drawing Sheets

U.S. PATENT DOCUMENTS

| | | | |
|---|---|---|---|
| 5,729,591 A | | 3/1998 | Bailey |
| 5,740,266 A | * | 4/1998 | Weiss et al. ............... 382/128 |
| 5,787,186 A | * | 7/1998 | Schroeder ............... 382/115 |
| 5,841,288 A | | 11/1998 | Meaney et al. |
| 5,850,599 A | | 12/1998 | Seiderman |
| 5,859,628 A | | 1/1999 | Ross et al. |
| 5,878,158 A | | 3/1999 | Ferris et al. |
| 5,956,525 A | * | 9/1999 | Minsky ............... 396/3 |
| 6,057,761 A | * | 5/2000 | Yukl ............... 340/568.1 |
| 6,072,895 A | | 6/2000 | Bolle et al. |
| 6,078,265 A | | 6/2000 | Bonder et al. |
| 6,122,737 A | | 9/2000 | Bjorn et al. |
| 6,144,848 A | | 11/2000 | Walsh et al. |
| 6,168,079 B1 | | 1/2001 | Becker et al. |
| 6,175,923 B1 | | 1/2001 | Bailey |
| 6,219,793 B1 | | 4/2001 | Li et al. |
| 6,232,937 B1 | | 5/2001 | Jacobsen et al. |
| 6,243,447 B1 | | 6/2001 | Swartz et al. |
| 6,270,011 B1 | | 8/2001 | Gottfried |
| 6,334,575 B1 | | 1/2002 | Su-Hui |
| 6,405,314 B1 | | 6/2002 | Bailey |
| 6,429,625 B1 | | 8/2002 | LeFevre et al. |
| 6,453,301 B1 | | 9/2002 | Niwa |
| 6,454,711 B1 | | 9/2002 | Haddad et al. |
| 6,492,986 B1 | * | 12/2002 | Metaxas et al. ............... 345/420 |
| 6,507,309 B2 | * | 1/2003 | McMakin et al. ............... 342/22 |
| 6,571,188 B1 | | 5/2003 | Clarridge et al. |
| 6,587,891 B1 | | 7/2003 | Janky et al. |
| 6,612,488 B2 | | 9/2003 | Suzuki |
| 6,664,916 B1 | | 12/2003 | Stafford et al. |
| 6,687,345 B1 | | 2/2004 | Swartz et al. |
| 6,687,346 B1 | | 2/2004 | Swartz et al. |
| 6,703,964 B2 | * | 3/2004 | McMakin et al. ............... 342/22 |
| 6,763,127 B1 | | 7/2004 | Lin et al. |
| 6,766,040 B1 | | 7/2004 | Catalano et al. |
| 6,775,777 B2 | | 8/2004 | Bailey |
| 6,792,291 B1 | | 9/2004 | Topol et al. |
| 6,870,791 B1 | | 3/2005 | Caulfield et al. |
| 6,891,381 B2 | * | 5/2005 | Bailey et al. ............... 324/644 |
| 6,900,980 B2 | | 5/2005 | Christopher |
| 6,965,340 B1 | | 11/2005 | Baharav et al. |
| 7,180,441 B2 | * | 2/2007 | Rowe et al. ............... 342/22 |
| 2001/0044331 A1 | | 11/2001 | Miyoshi et al. |
| 2001/0056359 A1 | | 12/2001 | Abreu |
| 2002/0060243 A1 | | 5/2002 | Janiak et al. |
| 2002/0087478 A1 | | 7/2002 | Hudd et al. |
| 2002/0089410 A1 | | 7/2002 | Janiak et al. |
| 2002/0129257 A1 | | 9/2002 | Parmelee et al. |
| 2002/0163780 A1 | | 11/2002 | Christopher |
| 2003/0067630 A1 | | 4/2003 | Stringham |
| 2003/0083042 A1 | | 5/2003 | Abuhamdeh |
| 2003/0118216 A1 | * | 6/2003 | Goldberg ............... 382/115 |
| 2003/0123754 A1 | * | 7/2003 | Toyama ............... 382/291 |
| 2003/0222142 A1 | | 12/2003 | Stevens |
| 2003/0235335 A1 | * | 12/2003 | Yukhin et al. ............... 382/190 |
| 2004/0012398 A1 | | 1/2004 | Bailey et al. |
| 2004/0058705 A1 | | 3/2004 | Morgan et al. |
| 2004/0096086 A1 | * | 5/2004 | Miyasaka et al. ............... 382/124 |
| 2004/0104268 A1 | | 6/2004 | Bailey |
| 2004/0133604 A1 | * | 7/2004 | Lordo ............... 707/104.1 |
| 2004/0204120 A1 | | 10/2004 | Jiles |
| 2005/0050617 A1 | * | 3/2005 | Moore et al. ............... 2/410 |
| 2005/0061873 A1 | | 3/2005 | Pirillo |
| 2005/0264303 A1 | | 12/2005 | Bailey et al. |
| 2006/0110010 A1 | * | 5/2006 | Bailey et al. ............... 382/115 |

FOREIGN PATENT DOCUMENTS

| | | |
|---|---|---|
| WO | WO 98/15929 | 10/1996 |

* cited by examiner

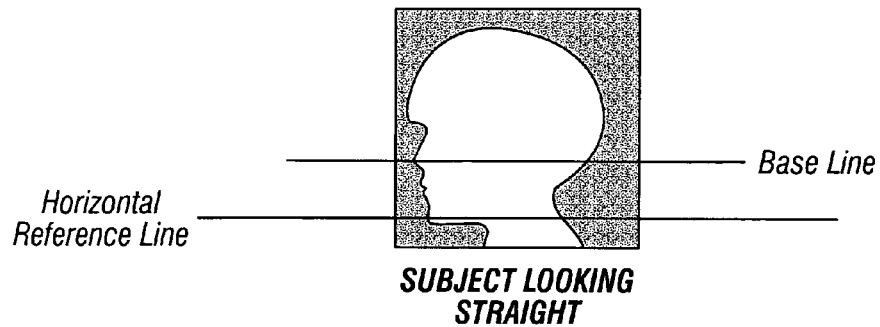
FIG. 2A — SUBJECT LOOKING STRAIGHT
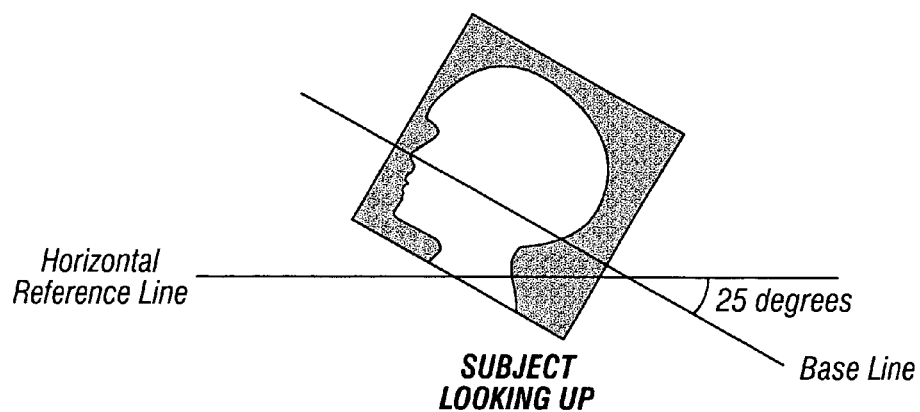
FIG. 2B — SUBJECT LOOKING UP
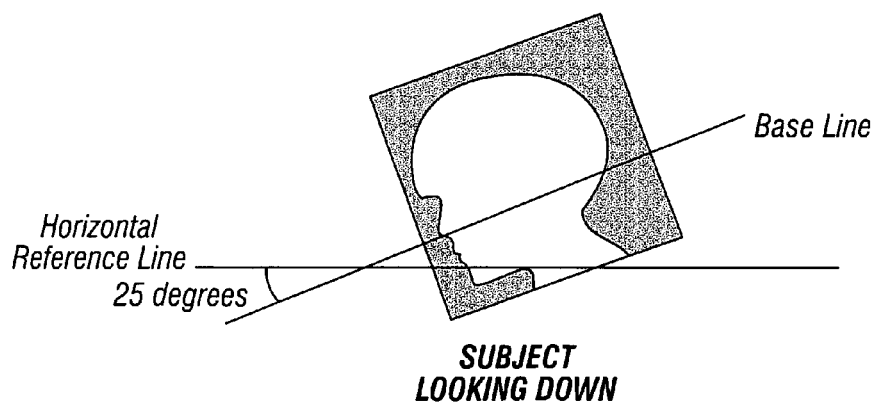
FIG. 2C — SUBJECT LOOKING DOWN

MINUTIA DETECTION FROM MEASUREMENT OF A HUMAN SKULL AND IDENTIFYING AND PROFILING INDIVIDUALS FROM THE HUMAN SKULL DETECTION

CLAIM OF PRIORITY

This application claims priority under 35 USC §119(e) to U.S. Patent Application Ser. No. 60/603,603, filed on Aug. 23, 2004, the entire contents of which are hereby incorporated by reference.

BACKGROUND

Positive identification of human beings has been used for many purposes including law enforcement and others. One of the most conventional ways of positive identification is via a fingerprint. Other techniques may include photography as well as other biometric techniques.

Around 1870, the French anthropologist Alfonse Bertillon devised a system to measure and record dimensions of certain bony parts of the body. These measurements were reduced to a value, effectively a multidimensional vector, which theoretically applies to only one person, and does not change during that person's adult life. The so-called Bertillon system was used for many years, until it was discredited in 1903. According to legend, a prisoner named Will West was sentenced to the US penitentiary in Leavenworth, Kans. That prisoner had Bertillon measurements which were exactly the same as another prisoner who was there at the same time. Coincidentally, they had the same name, but were different people. Their Bertillon measurements were close enough to identify them as the same person, however they had different fingerprints. It was alleged later that they were identical twin brothers. Around this time, law enforcement began using fingerprints for criminals and their identification.

In 1905, the U.S. Army began using fingerprints, and two years later, the U.S. Navy started doing the same. Around 1907, the Marine Corps joined in doing that. Many of the agencies began sending copies of their fingerprint cards to the national Bureau of criminal identification.

The science of fingerprinting continued to advance. In 1918, Edmond Locard wrote that if 12 points, called Galton's details, were the same between two fingerprints, that would suffice for positive identification. This is the origination of the so-called 12 points of comparison between fingerprints. While this is a guideline, there is no required number of points necessary for identification. Some countries set minimum standards of points of comparison. The United States has no set standard.

Since 1924, the FBI identification division has stored fingerprint files. By 1971, there were 200 million cards on file. The fingerprints are often scanned in terms of minutia as explained in U.S. Pat. Nos. 6,766,040; 6,763,127; 6,270,011; 6,078,265; 6,072,895; and 5,878,158.

Modern "AFIS" technology has split these files into a computerized part and a manually maintained part. Many of the manual files are duplicates, but there is no one accepted filing system. The FBI's new integrated AFIS site plans to stop using paper fingerprint cards completely. Many of the fingerprint cards are stored in a warehouse facility. Even more fingerprint data has been acquired from the US "visit" program, under which foreign nationals which wish to visit the United States must first go to their local US Embassy and apply for a visa. If the VISA is approved, the traveler is fingerprinted and then photographed. The fingerprint and photograph is compared against the traveler who arrives, to ensure identity. Difficulties with the fingerprint reader have often caused abandonment of the fingerprinting, in favor of simple manual comparison.

Other forms of positive identification such as DNA matching, blood typing and saliva matching have been used. Facial imaging, iris scanning, and palm geometry readers have been used in military applications and for government security.

The present inventors have filed other patent applications relating to unique individual identification.

SUMMARY

According to the present system, a body shape part is obtained, and a geometrical object is aligned with different reference points within the body shape. Measurements of that geometrical object are used as minutia to represent the body shape, either for unique identification or for comparison to a database.

BRIEF DESCRIPTION OF THE DRAWINGS

These and other aspects will now be described in detail with reference to the accompanying drawings, wherein:

FIG. 2 illustrates how the reference lines may be independent of the direction that the user is looking when taking the reference scan or the query scan;

DETAILED DESCRIPTION

The general structure and techniques, and more specific embodiments which can be used to effect different ways of carrying out the more general goals are described herein.

Figure 6:
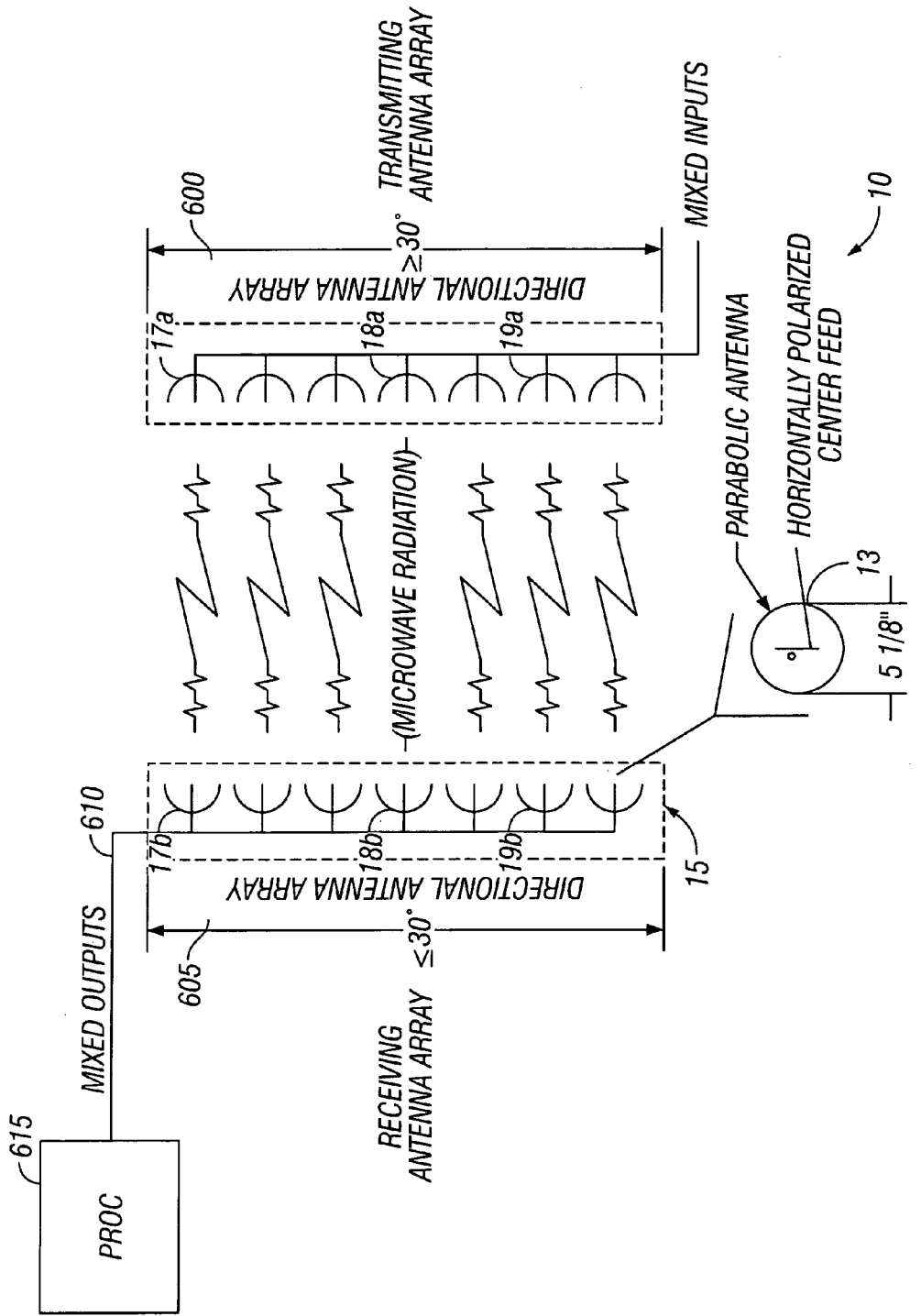

A human body can be scanned using the techniques described in U.S. Pat. No. 6,891,381, and co-pending application Ser. No. 11/056,945. FIG. 6 illustrates an exemplary embodiment in which a directional antenna array 600 is used to project electromagnetic radiation of some form, which is received by a directional array 605. The output of the array 605 may indicate information indicative of the profile of the person. The electromagnetic radiation can be microwave radiation, or many other forms of radiation as described herein. The outputs 610 can be provided to a processor, 615 which can be either local or remote or both.

The processor 615 is then used to process the data as described herein. The present application teaches techniques which can be used for reducing that raw information into minutia that can be used, for example, for at least one of storing, retrieving, cataloging and or comparing the results of a body scan.

One aspect describes using an individual's two-dimensional profile image to determine if that person is the same person listed on a specified identification card. One application can be for a visa identification, carried out by comparing a person's two-dimensional profile image to the image on the visa application, taken at a previous date in time.

In the embodiment, a silhouette of the person is taken at the time they apply for the identification card, or a visa. The image is sampled using electromagnetic radiation, for example millimeter waves, microwave energy, ultrasonic waves, coherent light, or a photo diode array. The sampling may illuminate the subject's head, neck and upper torso from one side. In the embodiment, a series of detectors or receivers may be located across from the transmission device on the opposite side of the individual to capture information therefrom. The received silhouette is cataloged.

In the embodiment, the silhouette is reduced to minutia and stored for further recall. In the embodiment, the resolution of the minutia may be sufficient to allow the sample to be used at some future time to determine if the previously stored image matches the person being screened or does not match the person.

If the image matches, then the person is granted access. If the image does not match, than the subject fails the identification test. The subject may be automatically denied access, or may be further processed in some way, either by manual scanning, or subject to criminal enforcement proceedings.

The subject is scanned with the positioning of the subject's head being used to consider a point of reference in determining whether the person is the same as the previous sample. If the person was previously sampled as looking straight ahead, and then subsequent screenings sample the person's head while looking up, looking down or looking in some other way, previous systems may have had difficulties with comparison purposes.

The present application defines the concept of a reference point. The reference point can be a center line, or a mean reference point. This is used for identification purposes.

Figure 1:
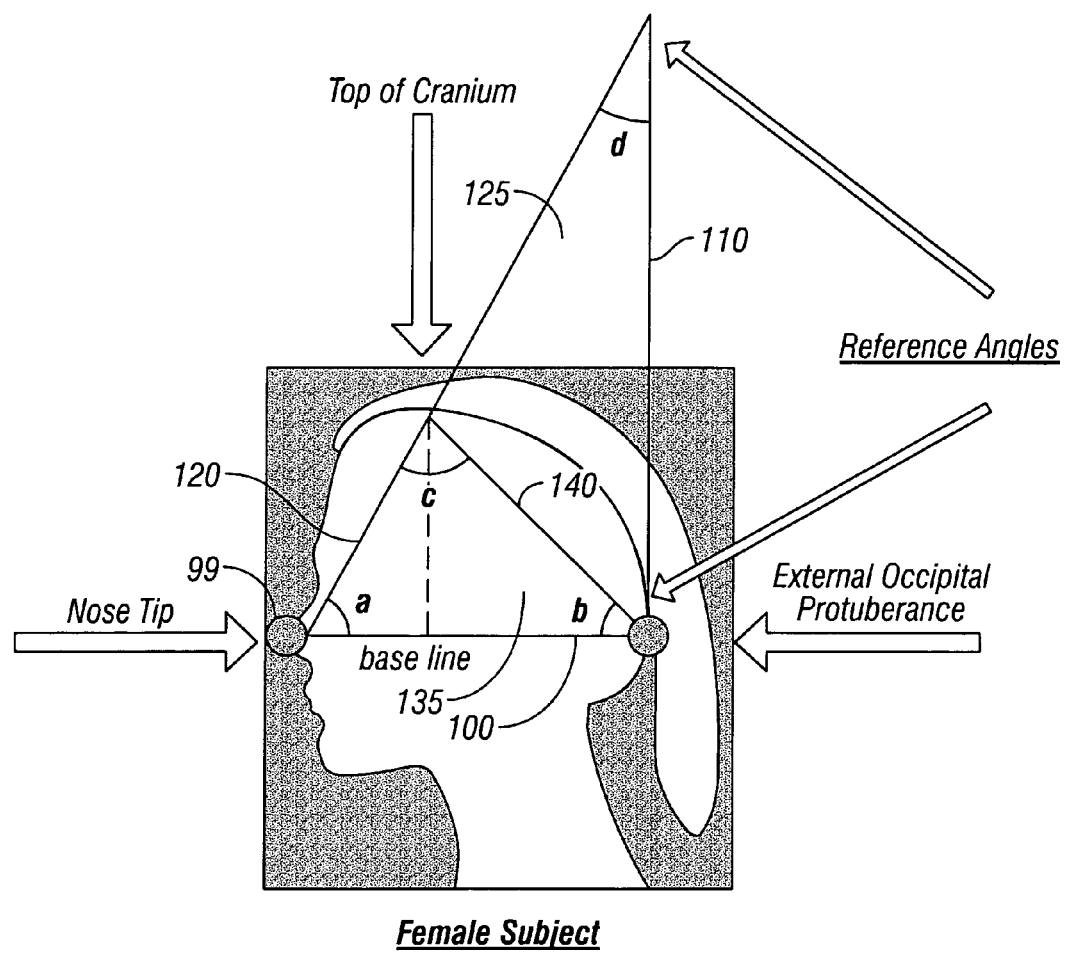
FIGS. 1, 3 and 4 show specified reference lines within a skull shape.

FIG. 1 shows a diagram of a subject's skull. According to the concepts of the present system, geometrical objects are intersected with the "silhouette" representing the diagram of the individual's skull. The geometrical objects obtain unique measurements based on that intersection.

Geometrical objects which are described herein may include lines, angles, triangles, and others. It should be understood that any other geometrical object, such as a trapezoid, polygon, or the like, can alternatively be used. A special line may be established within the diagram above the person's skull. This line is referred to within the specification as "the baseline". FIG. 1 illustrates the baseline 100 established from the tip 99 of the nose of the subject horizontally (relative to the skull's reference) to the external occipital protuberance of the skull.

A second line 110 is established that extends vertically upward from the external occipital protuberance. A third line extends from the nose tip 99 to a point in space that intersects the second line. The three lines 100, 110 and 120 form a right triangle 125.

A second triangle 135 is an isosceles triangle formed between the first line 100, and a portion of the second line 120 at the where it intersects with a third line 140 that extends from the external occipital protuberance.

These lines are all formed between baselines on this view, and form angles shown herein as a, b, c and d. While the above describes certain reference points, it should be understood that different reference points can be similarly used to form unique angles.

Figure 7:
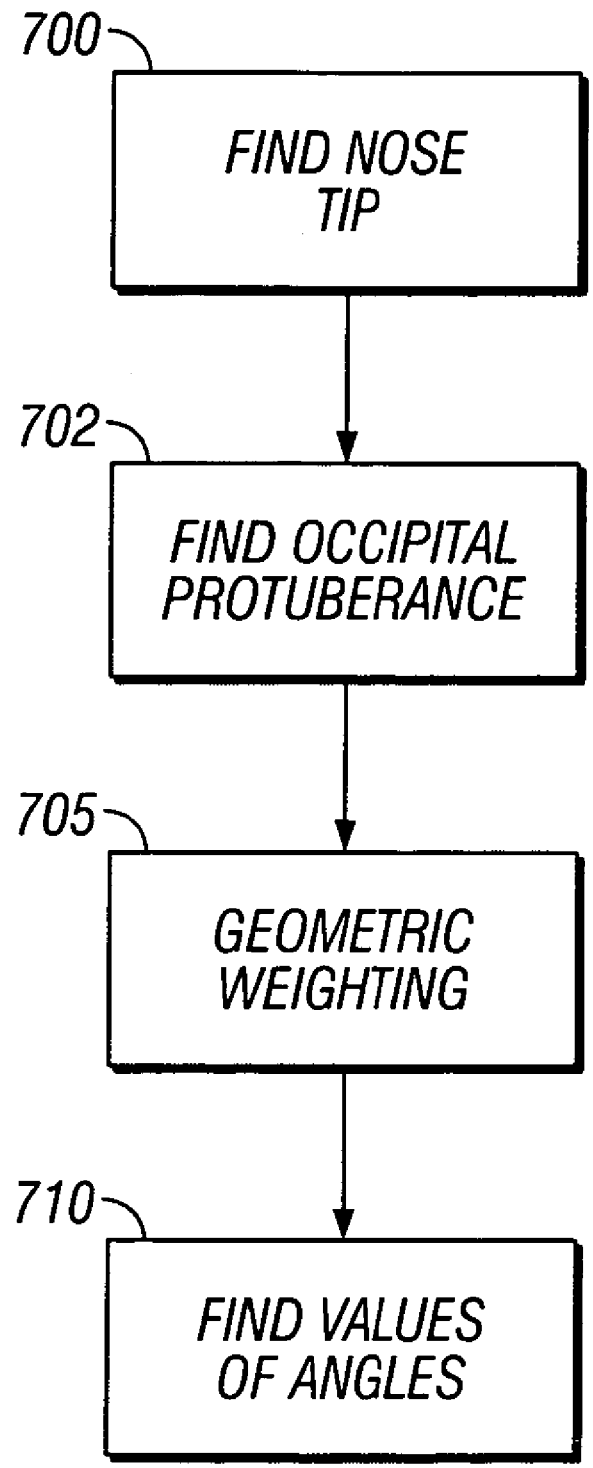
FIG. 7 illustrates a flow chart of operation of obtaining the minutia information.

The operation may be carried out by the processor 615, which may execute the flow chart of FIG. 7. Comparable flowcharts may be executed to obtain other information using different geometrical shapes, and obtaining different geometrical characteristics.

At 700, the image is processed using conventional image processing techniques to identify different features in the image. The image processing techniques, for example, may use a correlation technique, or may use artificial intelligence techniques. At 700, the image is processed to find the nose within the image. One way of doing this is to obtain a number of different exemplary forms of noses. Each of these noses are then correlated across the image, to find the portion of the image that includes the best least mean squares score to each of the sample noses. Another way is to simply look for a specified part of the nose, such as a nostril, which may not exist in other face portions. Yet another way uses a ruleset, that simply assumes that the portion of the face which extends furthest from the eye sockets is in fact the tip of the nose. In any case, any of these techniques can be used to find the nose tip at 700. Data indicative of the nose tip is stored. For example, the image may be defined as a series of points in x,y space, and the position of the nose may be stored as its x,y coordinates.

At 702, the image is again correlated to find the occipital protuberance, which is again stored as its x and y coordinates. At 705, an operation called geometric weighting is carried out, which extends a geometric line 100 between the points obtained in 702. Another line 110 is obtained as the perpendicular to that line, extending from the occipital protuberance. Another line 120 is obtained by extending the point from a, to intersect with 110. Each of these lines can be geometrically obtained from the already obtained information. At 710, the values of the angles a-d are obtained and stored. These may be obtained using conventional trigonometric techniques.

Angles formed by the line intersections are unique to the individual subject. These angles can be concatenated collectively to form a basis for probability analysis indicating that the subject being imaged can be distinguished from another individual. One aspect of this system may be a measure of probability of error.

It is projected that the world's population will increase to 8 billion by the year 2020. Therefore, to allow the system to operate effectively with zero error, one useful probability may be greater than one in $10^{10}$.

Figure 3:
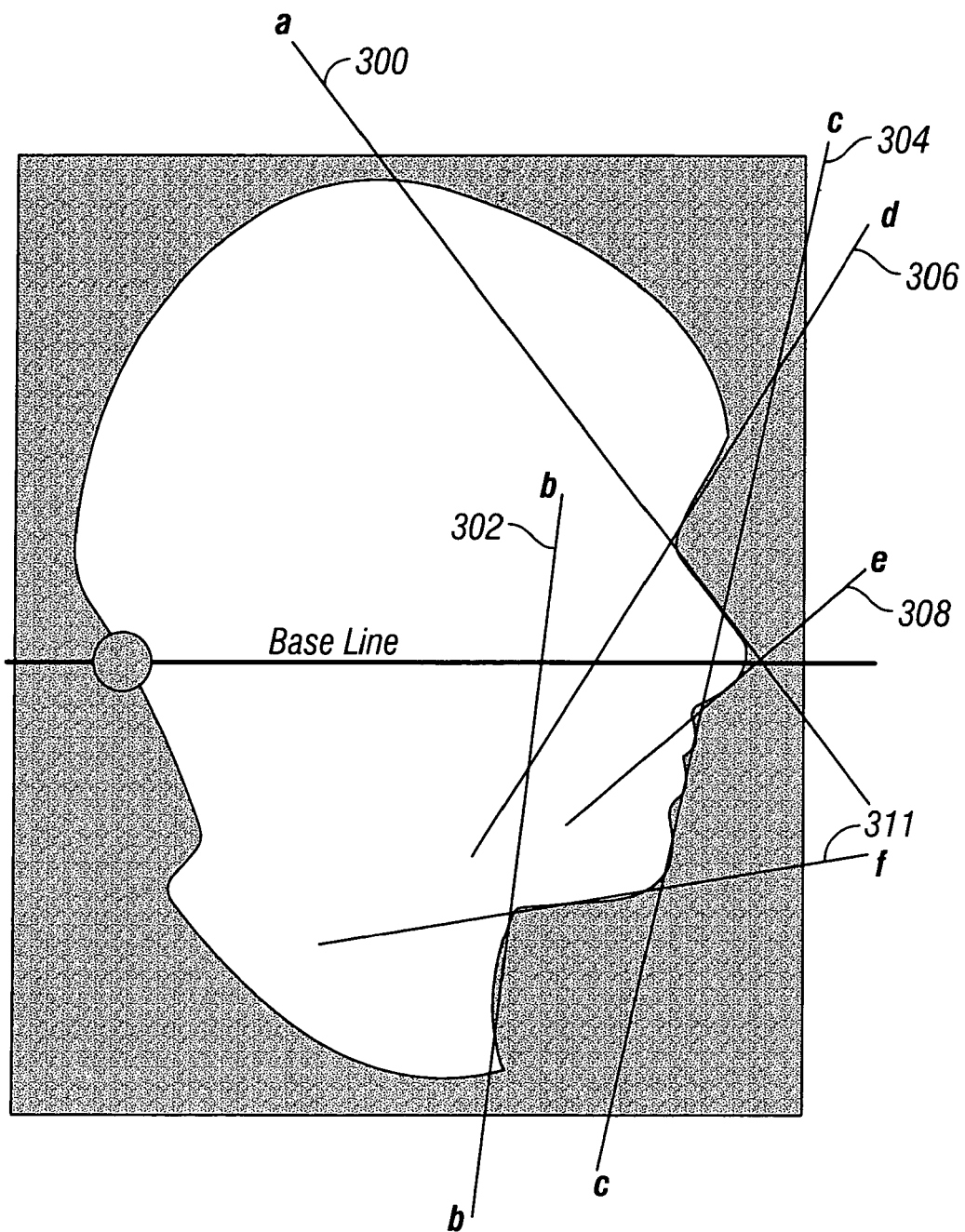

The scanning system may obtain an image with a resolution factor of 1 mm of resolution. This enables measuring the angles described above as well as the length of the nose, the length of the forehead, length of the jaw line, and baseline for an end to end. FIG. 3 illustrates the different lines which can be obtained between different reference points on the silhouette. FIG. 3 illustrates six lines shown as 300: a line extending up the ridge of the nose towards the back of the head, 302, a line extending generally parallel to the envelope of the neck, 34, a line extending generally across the chin of the users; 306, a line extending across the row of the user, 308 a line extending along the bottom of the nose of the user, 310, a line extending along the bottom of the chin of view. Each of these lines forms points and angles of intersection with both the baseline 100, as well as the other lines describing herein. This enables calculating an additional three legs and three angles.

The lengths and angles of the eight lines taking eight at a time may be used to create a unique profile of the subject. This may be used along with height and gender to provide a combination of 10 samples, taken 10 at a time. This may provide $10^{10}$ variations.

In one embodiment, length and curvature of the jaw line may be avoided because it changes drastically from significant weight loss or gain, and from time to time. Again, while this describes geometric lines and angles taken along specified reference points, different reference points may be defined.

FIGS. 2A-2C depict how the angle of the subject head can be used to achieve the baseline reference, independent of the direction that the user is looking. FIG. 2a shows the user looking straight ahead, with the baseline reference basically being parallel to the horizontal reference line. FIG. 2b illustrates the subject looking up and FIG. 2c illustrates the subject looking down. In each of these techniques, the baseline remains the same, and hence this system may be independent of direction that the individual is looking.

Figure 4:
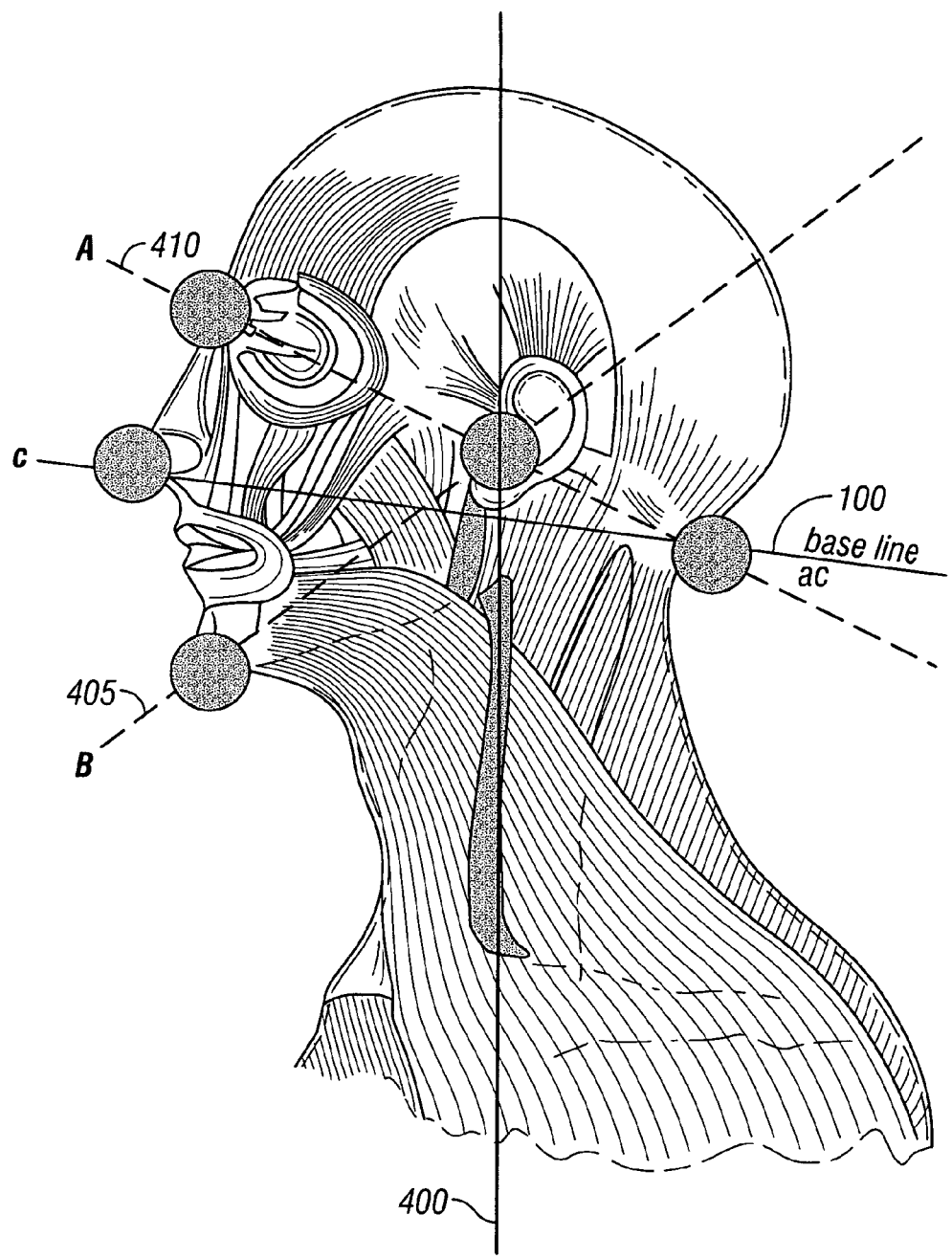

FIG. 4 illustrates a more detailed view of an anatomical skull along with specified baselines. The baseline 100 is shown extending between the points described above. The baseline may extend from the tip of the nose to the tip of the external occipital protuberance. FIG. 4 illustrates how different angles can be obtained. Another reference line 400 may be established from the vertical from the top of the skull through the center of the year, for example perpendicular to the baseline 100. Angles between the baselines, and other lines may form the angle versions. A line 405 may be established from the tip of the chin through the center of the ear. Another line 410 may be established through the center of the eye socket to the center of the ear. Each of these lines form angles with both the baseline reference 100, and the vertical reference 400.

The angles, or information about the lines themselves, may be used to form template minutia. The minutae represent a reduced version of the unique information about the individual, and can be used to rapidly identify individuals from unknown user groups, as compared with someone outside the known groups. By taking the lengths of the four lines, and the angles formed between them, a mathematical probability of correct identification is obtained. In an embodiment, this may be proportional to $6^6$, and if height and gender are added, $8^8$, or approximately 1 in 134 million. For example, if there is a group of 500,000 police officers, this might provide a likely error rate of 0.03% failure.

Figure 5:
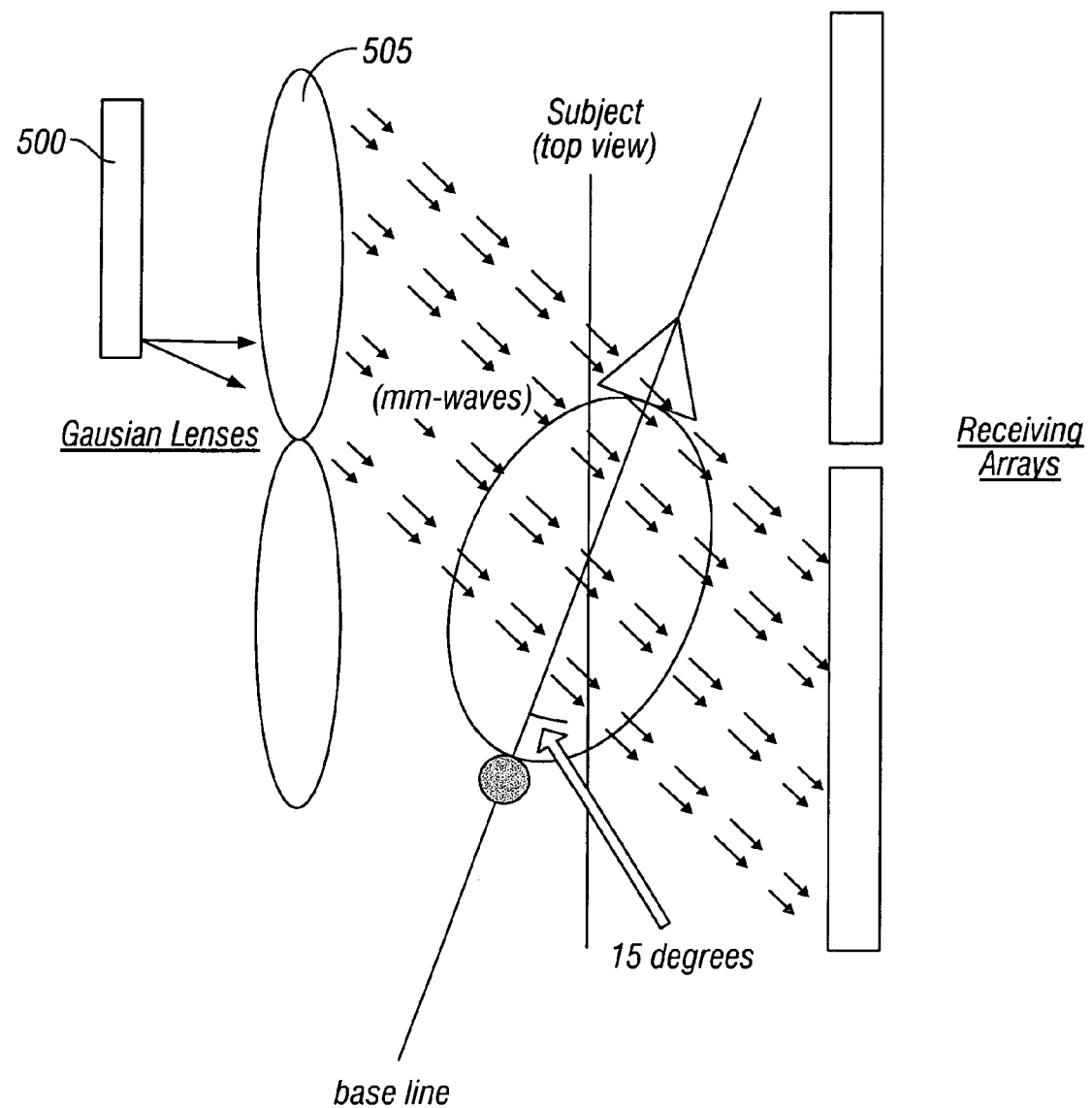
FIGS. 5 and 6 illustrate different ways of obtaining the scan.

As an alternative to the technique of obtaining silhouette information from an individual, the technique shown in FIG. 5 may be used. Electromagnetic radiation is formed by a transmitting array shown as 500. This may extend over any desired length to obtain a specified length of transmission silhouette. In the embodiment, the radiation is direct by at least one new Gaussian lens 505. The lens is shown as being an optical lens, but can alternatively be an electromagnetic lens. The radiation is detected downward and towards the subject, to illuminate the subject at a 15° angle relative to the baseline of the subject as shown. More generally, the lens 505 may be used to direct the illuminating radiation at a non-right angle to the torso.

Although only a few embodiments have been disclosed in detail above, other embodiments are possible and the inventor(s) intend these to be encompassed within this specification. The specification describes specific examples to accomplish a more general goal that may be accomplished in other way. This disclosure is intended to be exemplary, and the claims are intended to cover any modification or alternative which might be predictable to a person having ordinary skill in the art. For example, different lines, reference points, and different geometric constructs can be used. Polygons may be used to represent 3D information. Different numbers of lines/angles/polygons can be obtained. The information may be stored as raw numbers or as vectors.

Also, the inventor(s) intend that only those claims which use the words "means for" are intended to be interpreted under 35 USC 112, sixth paragraph. Moreover, no limitations from the specification are intended to be read into any claims, unless those limitations are expressly included in the claims.

What is claimed is:

1. A method comprising:
a scanner which projects extremely high frequency millimeter waves through a Gaussian lens; and
a computer performing the steps of:
obtaining an electronic representation of information, including at least the shape of an individual's skull, or skull volume, utilizing said scanner; and
forming a template minutia from said electronic representation about the individual's skull, based on geometrical constructs extending through reference points within said electronic representation.

2. A method as in claim 1, wherein said geometrical constructs comprise lines between specified reference points.

3. A method as in claim 2, wherein said geometrical constructs further comprise angles formed between those lines.

4. A method as in claim 2, wherein said specified reference points include a tip of the nose and an occipital part.

5. A method as in claim 1, wherein said obtaining comprises forming a profile of an individual, and storing the obtained profile in a computer database, in the form of said template minutia, for later retrieval.

6. A method as in claim 5, further comprising, comparing said template minutia with other template minutia, to determine a match.

7. A system comprising:
a scanner assembly which projects extremely high frequency millimeter waves through a Gaussian lens;
a memory storing electronic information representing a shape of an individual's skull, derived from said scanner assembly; and
a processor, identifying reference points on said shape and forming geometrical constructs which extend through said reference points and using characteristics of said geometrical constructs to represent individual information about the individual formed by intersections between said geometrical constructs and said shape.

8. A system as in claim 7, wherein said geometrical constructs comprise lines between specified reference points.

9. A system as in claim 8, wherein said geometrical constructs comprise lines between specified reference points, and angles formed between those lines.

10. A system as in claim 8, wherein said specified reference points include a tip of the nose and the occipital part.

11. A system as in claim 7, wherein said scanner assembly directs said extremely high frequency millimeter waves towards the individual at an angle which is oblique relative to a reference line of the skull.

* * * * *